No. 849,839. PATENTED APR. 9, 1907.
M. L. FISKE & J. R. SMITH.
SKIRT GUARD FOR BABY COACHES.
APPLICATION FILED NOV. 9, 1906.
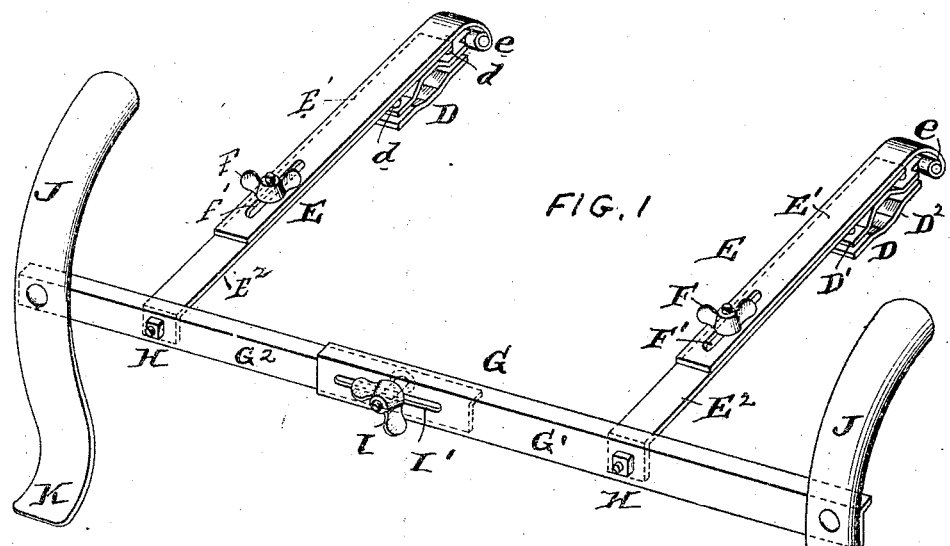
FIG. 1
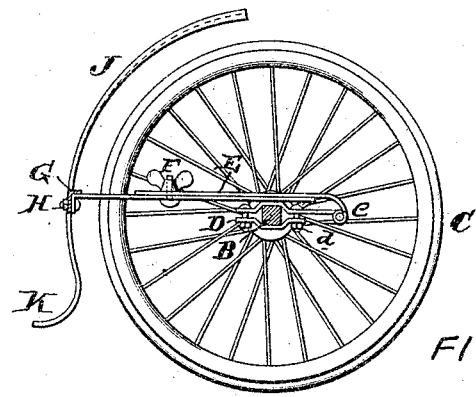
FIG. 2
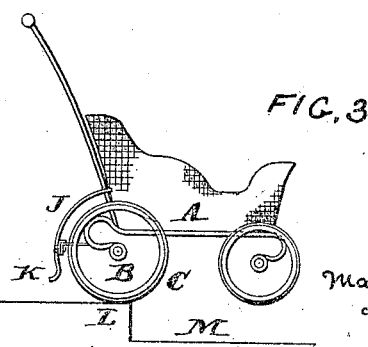
FIG. 3
WITNESSES:
Dan'l Webster, Jr.
R. M. Kelly
INVENTORS
Mary Lillie Fiske
and Jessie Rose Smith
BY
ATTORNEY.

UNITED STATES PATENT OFFICE.

MARY L. FISKE AND JESSIE R. SMITH, OF PORT CHESTER, NEW YORK.

SKIRT-GUARD FOR BABY-COACHES.

No. 849,839.　　　　　Specification of Letters Patent.　　　Patented April 9, 1907.

Application filed November 9, 1906. Serial No. 342,615.

*To all whom it may concern:*

Be it known that we, MARY LILLIE FISKE and JESSIE ROSE SMITH, both of Port Chester, Westchester county, State of New York, have invented an Improvement in Skirt-Guards for Baby-Coaches, of which the following is a specification.

Our invention has reference to guards for baby-coaches, and consists of certain improvements which are fully set forth in the following specification and shown in the accompanying drawings, which form a part thereof.

The object of our invention is to provide a suitable construction of wheel-guard which may be adapted to baby-coaches in general to shield or protect the skirt of the person moving the coach from contact with the soiled tires of the rear wheels.

While our invention may be made a permanent part of a baby-coach and applied at the time of manufacture, we prefer in those cases where the guard is to be applied to existing coaches to provide means of adjustment whereby the guard portions for the wheels may be brought into proper correlation with the rear wheels of the coach.

Our invention consists in a framework extending rearwardly from one of the axles and have lateral extensions to which the wheel-guards are attached, whereby said guards shield the rear portion of the tires of the wheels.

Our invention further consists in providing the framework with a pivoted connection whereby the guards may be permitted to rise temporarily to prevent their injury when the coach is being lowered over the curbing.

Our invention also consists in providing adjustment to said framework whereby the guards may be adjusted nearer to or farther from the axles to suit wheels of different diameters.

Similarly, our invention also consists in providing the frame with a transverse adjustment whereby the two guards may be adjusted nearer together or farther apart to suit different gages tracked by the wheels.

Our invention also comprehends details of construction which, together with the features above specified, will be better understood by reference to the drawings, in which—

Figure 1 is a perspective view of our improvement detached from a carriage. Fig. 2 is a sectional elevation of the same, showing the manner of attachment to the axle and wheel of the coach; and Fig. 3 is a side elevation illustrating the application of our invention and with the coach in act of crossing a curbing.

A is the coach, of any suitable construction. C are the rear wheels thereof, and B the rear axle.

D D are two clamps, each consisting of two plates $D'$ $D^2$, inclosing the axle B and clamped in place by bolts $d$ $d$. The upper plates $D'$ are preferably the longer and extend forward of the axle.

$E'$ $E'$ are arms hinged at $e$ $e$ to the plates $D'$ $D'$ and extend backward above the axle. These arms $E'$ $E'$ are secured to plates $E^2$ $E^2$ by clamping-screws F F and slots $F'$ $F'$. The slots are preferably in the arms $E'$ $E'$. This mode of connection of the arms $E'$ and plates $E^2$ gives extensibility, and the structures constitute adjustable arms E E. The end of the plates $E^2$ are flanged, and to these flanges are bolted at H H the angle-iron bars $G'$ and $G^2$, which together form a transverse bar G, carrying at the ends the wheel-guards J J. The bars $G'$ $G^2$ overlap and are connected by an adjustable joint comprising the slot I in the bar $G'$ and clamping-bolt I, extending through the slot and the other bar $G^2$. In this way the length of the transverse bar G may be adjusted to move the guards nearer or farther apart to suit the gage of the coach.

The lower ends K of the guards may be bent rearwardly, so as to form feet to strike the curbing L when the coach is being lowered to the roadway, as indicated in Fig. 3. In this case the guards with their supporting-frames will swing upward about pivots $e$ $e$ and not be broken when the feet K are brought into contact with the curb by the lowering of the coach over it.

By the adjustable features of the arms E E the guards may be adjusted to or from the axles to suit wheels of different diameters. It is, however, evident that when providing these guards to coaches at time of manufacture the adjustable features F $F'$ and I $I'$, or either of them, may be omitted.

By pivoting the arms E in advance of the axle they may be supported against downward movement by the axle, but at all times have capacity to swing upward.

The forms of clamps D D may be varied and otherwise the details of construction may be modified without departing from the spirit of the invention.

Having now described our invention, what we claim as new, and desire to secure by Letters Patent, is—

1. A wheel-guard for coaches consisting of a guard for the wheel, combined with a part clamped to the axle, and a frame jointed to the part clamped to the axle in advance of the axle and supporting at its rear part the guard.

2. A wheel-guard for coaches consisting of a guard for the wheel, combined with a part clamped to the axle, and a frame jointed to the part clamped to the axle in advance of the axle and supporting at its rear part the guard and extensible, so as to adjust the guard nearer to or farther from the axle.

3. A wheel-guard for coaches consisting of a guard for the wheel, combined with a part clamped to the axle, and a frame jointed to the part clamped to the axle in advance of the axle and supporting at its rear part the guard, said frame consisting of the hinge-arm E', the plate E² adjustably clamped to the arm E', and the transverse bar G' connecting the plate E² and guard.

4. In a wheel-guard for coaches, the combination of a frame hinged to the axle of the coach and extending rearwardly with freedom of upward movement at its rear or free part but supported against downward movement, and wheel-guards at each side of the frame and carried thereby in alinement with the wheels.

5. In a wheel-guard for coaches, the combination of the guard, an extensible hinged arm carrying the guard and hinged to the axle of the coach with freedom of upward movement at its rear or free end but supported against downward movement.

6. In a wheel-guard for coaches, the guard J having the lower portion K bent backward to form a foot at its bottom, combined with a hinged arm supporting the guard with freedom of upward motion.

7. In a wheel-guard for coaches, the combination of the transverse bar carrying the two guards, two hinge-arms carrying the transverse bar, and clamps for attachment to the axle and to which the arms are hinged.

8. In a wheel-guard for coaches, the combination of the transverse bar carrying the two guards, two extensible hinge-arms carrying the transverse bar, and clamps for attachment to the axle and to which the arms are hinged.

9. In a wheel-guard for coaches, the combination of the extensible transverse bar carrying the two guards, two hinge-arms carrying the transverse bar, and clamps for attachment to the axle and to which the arms are hinged.

In testimony of which invention we hereunto set our hands.

MARY L. FISKE.
JESSIE R. SMITH.

Witnesses:
J. W. DIEHL,
GEO. A. STUDWELL.